Dec. 31, 1963 G. V. MORRIS 3,116,454

REMOTE CONTROL SYSTEM WITH AUDIO AND VOLUME CONTROL FROM A SINGLE TRANSDUCER

Filed Dec. 12, 1960

INVENTOR
George V. Morris

BY John J. Pederson
ATTORNEY

United States Patent Office 3,116,454
Patented Dec. 31, 1963

3,116,454

REMOTE CONTROL SYSTEM WITH AUDIO AND VOLUME CONTROL FROM A SINGLE TRANSDUCER

George V. Morris, Chicago, Ill., assignor to Zenith Radio Corporation, a corporation of Delaware Filed Dec. 12, 1960, Ser. No. 75,390
1 Claim. (Cl. 325—391)

This invention relates to control systems for selectively accomplishing a plurality of control functions. More particularly, the invention relates to remote control systems for controlling a plurality of operating characteristics of a television receiver or the like.

Numerous systems have been evolved for providing for remote control of the significant operating characteristics of a television receiver, such as channel selection, power switching, volume or loudness control, and muting of the sound to shut off annoying commercial announcements or silence the set while answering the telephone. Optimum versatility is readily achieved when wire or cable connections from the control unit to the set are provided, but such cables are unsightly, hazardous, and generally impractical and have been largely supplanted by various types of wireless remote control systems. In wireless systems, whether of the radio signal or ultrasonic-acoustic-signal type, selectivity of control functions is achieved through the use of a plurality of distinctive control signal frequencies, one for each function to be performed. Obviously, each control function requires the provision of control equipment for detecting and utilizing transmitted signals of the assigned frequency, and as a practical matter, in view of the economic limitations imposed, wireless television remote control systems operating on more than four separate control frequencies are not considered to be commerically feasible. Channel selection in each of two directions (clockwise and counterclockwise) is generally considered a requirement for practical systems of this type, and this is accomplished with a bi-directional motor drive system accounting for two of the four available control frequencies. The remaining two frequencies may be utilized for loudness control and muting in various ways, with power switching being achieved most conventionally as a step in either the channel selection or loudness control cycle.

In some systems, continuous volume control in either of two directions (louder or softer) is provided with the use of a second-bi-directional motor drive system. While this has the advantage of permitting adjustment to any of an infinite variety of settings, and hence most closely approaches the conventional manually operated control in function and effect, it requires the use of both of the remaining two control frequencies. Consequently, the muting function can only be accomplished by turning the volume control down to its lowest setting; immediate and direct muting from any volume level cannot be achieved by remote control. Moreover, upon restoring the aubility of the receiver, the loudness must again be adjusted by trial and error to the desired sound level.

In some systems one of the remaining control frequencies is devoted solely to the power or on-off switching function. However, this leaves but a single control frequency available for the volume or loudness control function, and bi-directional volume control is no longer feasible. Hence, in such systems, a stepping relay or the like is arranged to establish any of a predetermined number (usually three or four) of different volume settings, and a corresponding number of control operations are required to effect the complete volume control cycle. Thus, remote-control muting and unmuting can only be accomplished by cycling the volume control through its maximum-loudness position; again, immediate or direct muting and unmuting from and to a given volume level cannot be achieved.

Of course, to provide for immediate or direct muting and unmuting, a separate control frequency may be devoted entirely to that function, and the remaining control frequency is sufficient to provide for a step-cycle volume or loudness control. However, such systems have heretofore required a separate electromechanical transducer such as a muting relay in addition to the driving motor or stepping relay use for effecting the volume control function. The only other alternative in prior systems has been to employ a third control frequency for the muting function, and this can only be done as a practical matter at the cost of restricting the channel selection function to a single direction, which obviously detracts from the overall convenience of the system.

Accordingly, it is a primary object of the invention to provide a new and improved control system for use in conjunction with a television receiver or the like.

It is a more particular object of the invention to provide a wireless television remote control system which overcomes the aforementioned disadvantages of prior systems.

In accordance with the invention, a control system for selectively effectuating control of two different operating characteristics in response to respective command signals comprises means for receiving the command signal and a bi-directional driving device. The system further includes means coupled to the receiving means and to the driving device and responsive to one of the command signals for actuating the driving device in one direction and to the other of the command signals for actuating the driving device in the other direction. The system further includes means including a pair of control devices coupled to the driving device and adapted to be selectively operated by the driving device in accordance with its direction of actuation for independently controlling the respective operating characteristics.

The features of the present invention which are believed to be novel are set forth with particularity in the appended claim. The organization and manner of operation of the invention, together with further objects and advantages thereof, may best be understood by reference to the following description taken in connection with the accompanying drawings, in the several figures of which like reference numerals identify like elements, and in which:

Figures 1, 2:
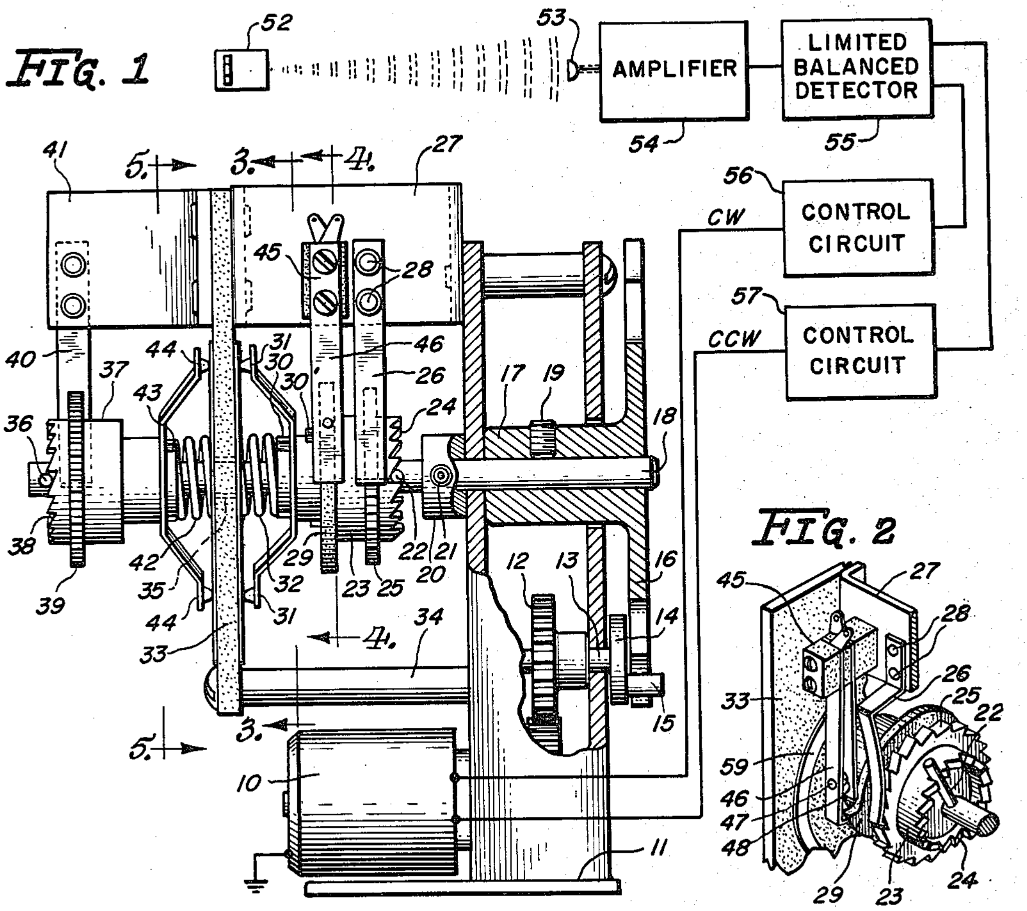
FIGURE 1 is a diagrammatic view of a remote control system embodying the invention, in which a component control device is shown in structural cross section.
FIGURE 2 is a perspective view of a portion of the control device shown in the system of FIGURE 1.

Reference is now made to FIGURE 1 wherein one embodiment of the invention is shown. A direct-current reversible motor 10 is mounted on a supporting frame 11 and is coupled through a suitable gear chain (not shown) to a driving gear 12. Gear 12 is connected through a shaft 13 to a plate 14 which has an eccentric pin 15 mounted thereon. Pin 15 engages a Geneva wheel 16 designed to step one twelfth of a complete rotation or 30° with each complete rotation of plate 14. The Geneva wheel is shown as a twelve position device, but it should be understood that any other number of steps may be selected to fit the required number of control positions. The drive system is designed in known fashion to complete a full rotation of shaft 13 each time the motor is energized.

Geneva wheel 16 has a hub 17 encompassing a driven shaft member 18 and is held in place on shaft 18 by a set screw 19. Driven member 18 passes through support frame 11 and is supported for rotation in either of two directions. A collar 20 is securely affixed to the driven member by a set screw 21. A pin 22 affixed to and projects radially from driven member 18 engages a ratchet wheel 24 of a unidirectional clutch element 23, which is freely rotatable about shaft 18. Unidirectional clutch element 23 has a ratchet wheel 25 peripherally located about its circumference for engagement by a pawl 26 affixed by rivets 28 to a support body 27. And in turn support body 27 is securely fastened to support frame 11. A cam 29 composed of insulating material is snugly held to unidirectional clutch element 23 and is driven by a key 30 to respond to rotation of the unidirectional clutch element 23.

A conductive contact element 31 which is displaceable between several positions is mounted on clutch element 23 and is driven by a key 30' to respond to rotation of unidirectional clutch element 23. A spring 32 encompassing shaft 18 is in compression between an insulating sheet 33 and unidirectional clutch element 23. Sheet 33 is securely held to and spaced from support frame 11 by a spacer 34 and by support body 27. Shaft 18 extends through an aperture 35 in sheet 33 and a pin 36 projects radially from and is secured to shaft 18. Pin 36 engages a second unidirectional clutch element 37 through a ratchet wheel 38. Clutch element 37 has a ratchet wheel 39 peripherally located about its circumference for engagement by a pawl 40 affixed to an arm 41 extending from insulating sheet 33. A compression spring 42 encompasses shaft 18 and is positioned between clutch element 37 and sheet 33. A key 43 engages a second conductive contact element 44 to rotate it in response to unidirectional rotation of the clutch element 37. A switch 45 mounted on support 27 has a switch arm 46 in contact with cam 29. As shown more specifically in FIGURE 4, the switch contacts 47 and 48 are opened and closed in response to the rotation of cam 29. Electrical connections through the terminals 49 and 50 are made to the power supply circuit of the television chassis 51, so that switch 45 is in series with the manual on-off switch 51A.

Referring again to FIGURE 1, the transmitter 52 is designed to generate command signals of at least two different frequencies. A microphone 53 is designed to receive these command signals and feeds the command signals through an amplifier 54 to a limiter and balanced detector unit 55. Depending upon the frequency of the command signal, a control signal is applied to one or the other of the control circuits 56, 57 which are designed to pass current through motor 10 in either of two directions for clockwise (cw.) or counterclockwise (ccw.) rotation.

Figures 3, 4:
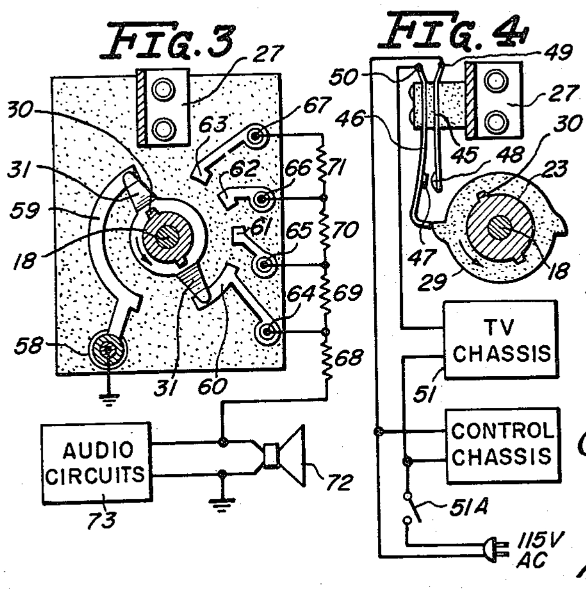
FIGURE 3 is a sectional view along line 3—3 of FIGURE 1.
FIGURE 4 is a sectional view along line 4—4 of FIGURE 1.

Referring now to FIGURE 3 which is a cross-sectional view of one of the control devices along line 3—3 in FIGURE 1, a plurality of switch contacts 59, 60, 61, 62 and 63 are printed on one side of sheet 33 and adapted for engagement by conductive element 31. A grounded terminal 58 is connected to contact 59. Contacts 60, 61, 62 and 63 are connected to the terminals 64, 65, 66 and 67 respectively. The resistance 68 is connected between terminal 64 and one side of the speaker 72 the other side of which is connected to a point of reference potential such as ground. Speaker 72 of course is energized from the circuits 73 of the receiver. A resistance 69 is connected between terminals 64, 65; a resistance 70 is connected between terminals 65, 66 and resistance 71 is connected between terminals 66, 67.

Figure 5:
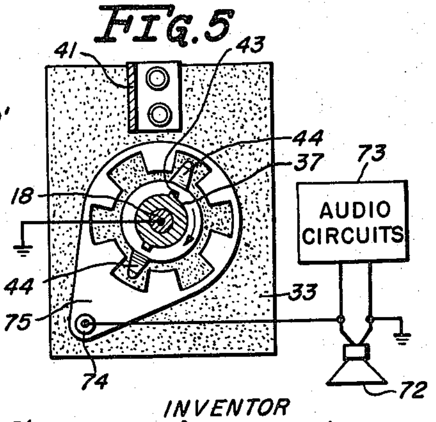
FIGURE 5 is a sectional view along line 5—5 of FIGURE 1.

FIGURE 5 as shown is a partial cross-sectional view of the other of the control devices along line 5—5 in FIGURE 1. This control device consists of a printed contact 75 on the other side of sheet 33 which is connected to a terminal 74. Conductive element 44 is connected to ground through shaft 18, and terminal 74 is connected to the ungrounded side of speaker 72.

In operation, the illustrated embodiment of the invention provides for controlling three functions of a television receiver; an on-off control, a stepped volume control and a muting control. The arrangement is such that the receiver may be turned on to a low volume, stepped to any of an intermediate series of volumes, and turned off. Moreover, it is possible to achieve direct muting and unmuting of the audio output from and to any one of the preselected volume settings.

More particularly, with reference to FIGURE 1, the remote control transmitter 52 is designed to produce command signals of two different frequencies above the audible range. As known in the prior art, ultrasonic frequencies of about 40 and 41 kilocycles are especially adapted for this use. To turn the television receiver on remotely, transmitter 52 is actuated to generate a command signal which is received by microphone 53 and transmitted to amplifier 54 which in turn feeds the signal to limiter and balanced detector unit 55. The "on" command signal is detected in unit 55 and channeled to control circuit 57. This causes a direct current to flow producing counterclockwise direction of rotation of the motor 10. The motor 10 drives the gear chain and rotates gear 12 one complete turn. This in turn rotates plate 13 which supports pin 15 and engages the Geneva wheel 16 rotating it and shaft 18 30° in a counterclockwise direction. Pin 22 is firmly engaged with the ratchet wheel 24 of clutch element 23 and causes the latter to rotate 30°. Cam 29 is keyed to clutch element 23 and therefore also rotates in a counterclockwise direction (as is more clearly shown in FIGURE 4) and switch arm 46 in contact with cam 29 goes into its second position closing the contact between arms 45 and 46. This applies voltage to the television chassis 51 and the television receiver is properly turned on. Conductive element 31 of the first control device is also keyed to clutch element 23 and rotates 30° in a counterclockwise direction from the position shown in FIGURE 3. In this position as in the "off" position, resistor 68 is in parallel with speaker 72 across the audio circuit, and resistor 68 is proportioned to establish a predetermined minimum volume setting.

Referring again ot FIGURE 1, clutch element is prevented from rotation by pawl 40 which engages ratchet wheel 39. Shaft 18 rotates pin 36 and causes clutch element 37 to be driven to the right, compressing spring 42 until pin 36 has ridden up the ratchet tooth and over the crown of the tooth. The spring tension then drives the clutch element to the left until pin 36 rests at the base of the next notch on the ratchet wheel. Conductive element 44 of the second control device therefore does not rotate but remains in the position it was in prior to transmission of the remote control command signal to turn the receiver on. As shown in FIGURE 5, this position is one in which conductive wiper element 44 contacts only the insulating sheet 33 and is therefore ineffective. Thus, a predetermined "low" volume setting is achieved.

Should a louder audio signal from the speaker be desired, a second command signal of the same frequency is transmitted from transmitter 52. The signal is received by microphone 53, amplified by amplifier 54, and fed to control circuit 57 to effectuate another step in the direction of counterclockwise rotation of motor 10. As before, shaft 18 rotates another 30°. Unidirectional clutch element 23 is rotated by pin 22 another 30° (since this is counterclockwise rotation, clutch element 37 is again held in place by pawl 40 so that element 44 remains unaffected).

Thus, displaceable element 31 is moved from contact 60 to contact 61 while remaining in electrical contact with contact 59. This switches resistor 69 in series with resistor 68 across the loudspeaker 72. This in effect places a higher resistance across the output of the audio circuits and draws proportionately less audio current produced by the audio circuits so that more of the current flows through speaker 72. Thus there is produced a louder audio signal from speaker 72.

In similar fashion, resistors 70 and 71 may be successively switched into the circuit to produce progressively higher volume levels by producing subsequent remote command signals from the transmitter which causes shaft 18 to rotate in steps of 30°; when displaceable element 31 is in a vertical position, none of the resistances are connected across the speaker and all of the signal is developed at speaker 72 so that full or maximum volume is achieved. During all of these steps cam 29 rotates but does not open the contacts between switch arms 45, 46. Similarly, the muting control element 44 remains in an ineffective position (shown in FIGURE 5) through the counterclockwise rotation of shaft 18.

However, if it is desired to mute the television receiver from any of the various settings of the volume of the receiver, a remote command signal of a second frequency is generated by transmitter 52. The command signal is picked up by microphone 53, amplified by amplifier 54 and fed to limiter-balanced-detector 55. The detected command signal is channelled by unit 55 to control circuit 56, causing motor 10 to rotate in a clockwise direction. As a result, plate 13 revolves and pin 15 drives Geneva wheel 16 30° in the clockwise direction. Pawl 26 engages ratchet wheel 25 and prevents rotation of clutch element 23 in a clockwise direction. Pin 22 however is rotated by driven member 18 and drives clutch element 23 to the left in FIGURE 1, compressing spring 32. When pin 22 reaches the crown of a tooth of ratchet wheel 24, clutch element 23 is returned to its original position by the spring 32. Thus, switch element 31 fastened to clutch element 23 does not rotate and is maintained in contact with the same contacts that it had prior to the receipt of the command signal to "mute." Likewise the "off-on" switch is not actuated since cam 29 does not move during clockwise rotation of the driven member.

At the same time, however, pin 36 affixed to shaft 18 drives clutch element 37 30° in a clockwise direction. Displaceable switch element 43, which is keyed to clutch element 37, also rotates 30° clockwise from the position shown in FIGURE 5 and makes electrical contact between terminal 74 and ground. This places a short circuit across loudspeaker 72 and instantaneously mutes or silences the reecivei.

When it is desired to restore the sound, it is merely necessary to transmit another command signal of the appropriate frequency from the transmitter to the microphone which causes motor 10 to drive Geneva wheel 16 another 30° in a clockwise direction. Clutch element 23 again is held in place by pawl 26 and there is no change in the "on-off" setting of the television chassis nor in the volume position of the first control device. However clutch element 37 is driven by pin 36 in a clockwise direction 30° and the displaceable switch element 44 moves from a closed, grounding circuit position to an open position and the short circuit is removed from speaker 72. Thus the receiver is instantaneously and directly returned to whatever volume setting it had before muting.

Hence the invention provides a new and improved control system which is especially adapted for use in wireless remote control of television receivers and the like and affords greatly increased versatility as compared with prior systems for such service. In its principal application, it provides for remote on-off switching, stepped volume control, and instantaneous or direct muting and unmuting from and to any preset volume level, all with the use of only two command signal frequencies and with a single electromechanical transducer.

While a particular embodiment of the invention has been shown and described, it will be obvious to those skilled in the art that changes and modifications may be made without departing from the invention in its broader aspects and, therefore, the aim of the appended claim is to cover all such changes and modifications as fall within the true spirit and scope of the invention.

I claim:

In a television receiver or the like of the type adapted for remote control in response to received command signals of predetermined identifying frequencies, a system for use in the audio section of said receiver to provide stepped volume control and direct audio muting and unmuting from any selected volume level with a single transducer and a pair of command signal frequencies, said system comprising:

a shaft supported for rotation in either of two opposite directions;

a bidirectional motor;

means coupling said motor to said shaft and responsive to energization of said motor for effecting a predetermined incremental rotation of said shaft;

a first switch device having a plurality of spaced fixed contacts and a displaceable element adapted to sequentially engage said fixed contacts;

a second switch device having a plurality of spaced fixed contact elements and a displaceable element adapted to alternately engage and disengage said fixed contact elements;

a pair of unidirectional clutches respectively establishing mechanical driving connections from said shaft to said displaceable elements of said first and second switch devices so that one of said displaceable elements is displaced in response to incremental rotation of said shaft in one direction while the other is displaced in response to incremental rotation of said shaft in the opposite direction;

means including said first switch device and responsive to incremental displacement of its displaceable element by an amount correlated with said predetermined incremental shaft rotation for controlling the volume level of sound from said receiver;

means including said second switch device and responsive to incremental displacement of its displaceable element by an amount correlated with said predetermined incremental shaft rotation for alternately muting and unmuting the sound from said receiver from any selected volume level;

means responsive to command signals of one of said frequencies for energizing said motor to drive said shaft in said one direction and initiate said incremental displacement of the displaceable element of said first device only;

and means responsive to command signals of the other of said frequencies for energizing said motor to drive said shaft in said opposite direction and initiate said incremental displacement of the displaceable element of said second device only.

References Cited in the file of this patent

UNITED STATES PATENTS

| | | |
|---|---|---|
| 1,841,283 | Fleig | Jan. 12, 1932 |
| 2,206,926 | Thompson | July 9, 1940 |
| 2,312,035 | Groenenberg et al. | Feb. 23, 1943 |
| 2,388,748 | Koptezky | Nov. 13, 1945 |
| 2,680,164 | Lennox | June 1, 1954 |
| 2,817,025 | Adler | Dec. 17, 1957 |

FOREIGN PATENTS

| | | |
|---|---|---|
| 496,246 | Canada | Sept. 22, 1953 |

OTHER REFERENCES

Perpetual Trouble Shooter's Manual, vol. 2 by J. F. Rider.